US012744332B2

(12) United States Patent
Franson

(10) Patent No.: US 12,744,332 B2
(45) **Date of Patent: *Sep. 22, 2026**

(54) ANTENNA ARRAY WITH INDEPENDENT RFIC CHIP AND ANTENNA ELEMENT LATTICE GEOMETRIES

(71) Applicant: VIASAT, INC., Carlsbad, CA (US)

(72) Inventor: Steven Franson, Carlsbad (CA)

(73) Assignee: VIASAT, INC., Carlsbad, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/981,752

(22) Filed: Dec. 16, 2024

(65) Prior Publication Data

US 2025/0226595 A1 Jul. 10, 2025

Related U.S. Application Data

(63) Continuation of application No. 17/996,280, filed as application No. PCT/US2021/014666 on Jan. 22, 2021, now Pat. No. 12,170,406.

(Continued)

(51) Int. Cl.
*H01Q 1/22* (2006.01)
*H01Q 1/38* (2006.01)
(Continued)

(52) U.S. Cl.
CPC .......... *H01Q 21/24* (2013.01); *H01Q 1/2283* (2013.01); *H01Q 21/0006* (2013.01); *H01Q 21/065* (2013.01)

(58) Field of Classification Search
CPC .......... H01Q 1/22; H01Q 1/2283; H01Q 1/38; H01Q 21/00; H01Q 21/0006; H01Q 21/06; H01Q 21/065; H01Q 21/24; H01Q 23/00
See application file for complete search history.

(56) References Cited

U.S. PATENT DOCUMENTS 9,472,859 B2 * 10/2016 Dang .................. H01Q 21/065
10,263,330 B2 4/2019 Martikkala et al.
(Continued)

FOREIGN PATENT DOCUMENTS

CN 109586752 A 4/2019
CN 110892580 A 3/2020
(Continued)

OTHER PUBLICATIONS

International Search Report dated May 11, 2021 in corresponding International Application Serial No. PCT/US2021/014666 (12 pages).

*Primary Examiner* — Tho G Phan
(74) *Attorney, Agent, or Firm* — F. CHAU & ASSOCIATES, LLC

(57) ABSTRACT

An antenna apparatus includes a first component layer having a plurality of RFICs arranged in a first lattice geometry (e.g., rectangular), where each RFIC comprises beamforming circuitry. A second, parallel component layer overlays the first component layer and includes a plurality of antenna elements arranged in a second, different lattice geometry (e.g., triangular). The antenna elements have respective feed points each coupled to an input/output (I/O) pad of an RFIC. Each I/O pad is aligned with the feed point coupled thereto along an axis orthogonal to the first and second layers.

22 Claims, 13 Drawing Sheets

Related U.S. Application Data

(60) Provisional application No. 63/011,056, filed on Apr. 16, 2020.

(51) Int. Cl.

| | |
|---|---|
| ***H01Q 21/00*** | (2006.01) |
| ***H01Q 21/06*** | (2006.01) |
| ***H01Q 21/24*** | (2006.01) |

(56) References Cited

U.S. PATENT DOCUMENTS

| | | | | |
|---|---|---|---|---|
| 10,355,370 | B2 | 7/2019 | Mcmorrow et al. | |
| 10,446,938 | B1 | 10/2019 | Wang et al. | |
| 11,038,281 | B2 | 6/2021 | Franson et al. | |
| 11,205,846 | B2 | 12/2021 | Greene et al. | |
| 11,362,418 | B2 * | 6/2022 | Kuroda | H01Q 1/521 |
| 11,509,352 | B2 | 11/2022 | Cho et al. | |
| 11,811,141 | B2 | 11/2023 | West et al. | |
| 12,170,406 | B2 * | 12/2024 | Franson | H01Q 21/065 |
| 12,418,096 | B2 * | 9/2025 | Astorga | H01Q 1/2283 |
| 12,542,359 | B2 * | 2/2026 | Yang | H01Q 1/2283 |
| 12,555,902 | B2 * | 2/2026 | Franson | H01Q 1/526 |
| 2015/0171523 | A1 | 6/2015 | Kamgaing et al. | |
| 2016/0261036 | A1 | 9/2016 | Sato et al. | |
| 2016/0359461 | A1 | 12/2016 | He et al. | |
| 2019/0044251 | A1 | 2/2019 | Mcmorrow et al. | |
| 2023/0223707 | A1 | 7/2023 | Franson | |

FOREIGN PATENT DOCUMENTS

| | | | |
|---|---|---|---|
| WO | WO2018116781 | A1 | 6/2018 |
| WO | 2019130771 | | 7/2019 |
| WO | 2019190417 | A1 | 10/2019 |
| WO | WO2019187872 | A1 | 10/2019 |
| WO | 2021211186 | | 10/2021 |

* cited by examiner

ANTENNA ARRAY WITH INDEPENDENT RFIC CHIP AND ANTENNA ELEMENT LATTICE GEOMETRIES

RELATED APPLICATIONS

The present application is a continuation under 35 U.S.C. 120 of U.S. patent application Ser. No. 17/996,280, filed Oct. 14, 2022 in the United States Patent and Trademark Office as a 371 National Stage entry of PCT application no. PCT/US2021/014666, filed Jan. 22, 2021, which claims the benefit of priority to U.S. Provisional Application No. 63/011,056 filed on Apr. 16, 2020, entitled, "Antenna Array with Independent RFIC Chip and Antenna Element Lattice Geometries", the entireties of which are incorporated herein by reference.

TECHNICAL FIELD

This disclosure relates generally to antenna arrays with distributed RFIC chips.

DISCUSSION OF RELATED ART

Antenna arrays are currently deployed in a variety of applications at microwave and millimeter wave frequencies, such as in aircraft, satellites, vehicles, and base stations for general land-based communications. Such antenna arrays typically include microstrip radiating elements driven with phase shifting beamforming circuitry to generate a phased array for beam steering. In many cases it is desirable for an entire antenna system, including the antenna array and beamforming circuitry, to occupy minimal space with a low profile while still meeting requisite performance metrics.

An "embedded" antenna array may be defined as an antenna array constructed with antenna elements integrated with radio frequency integrated circuit chips (RFICs) in a compact structure. An embedded array may have a sandwich type configuration in which the antenna elements are disposed in an exterior component layer and the RFICs are distributed across the effective antenna aperture within a proximate, parallel component layer behind the antenna element layer. The RFICs may include power amplifiers (PAs) for transmit, low noise amplifiers (LNAs) for receive, and/or phase shifters for beam steering. By distributing PAs and LNAs in this fashion, higher efficiency on transmit and improved noise performance on receive are attainable. Reliability of the antenna array may also be improved, since the overall antenna performance may still be acceptable even if a small percentage of the amplifiers malfunction. The RFICs typically include other beamforming circuitry such as filters, impedance matching elements, RF couplers, transmit/receive (T/R) switches and control lines.

SUMMARY

In an aspect of the present disclosure, an antenna apparatus includes a first component layer including a plurality of RFICs arranged in a first plane with a first lattice geometry, where each RFIC comprises beamforming circuitry. A second component layer overlays the first component layer and includes a plurality of antenna elements arranged in a second plane parallel to the first plane, with a second, different lattice geometry. The antenna elements have respective feed points each coupled to an input/output (I/O) pad of an RFIC. The I/O pad is aligned with the feed point coupled thereto along an axis orthogonal to the first and second planes.

The first lattice geometry may be rectangular and the second lattice geometry may be triangular.

Since the I/O pads of the RFICs are aligned with the feed points of the antenna elements, transmission lines and/or additional redistribution layers between the first and second layers may be avoided, allowing for a compact, low loss design.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with a dash and second label that distinguishes among the same/similar elements (e.g., −1, −2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Figure 1:
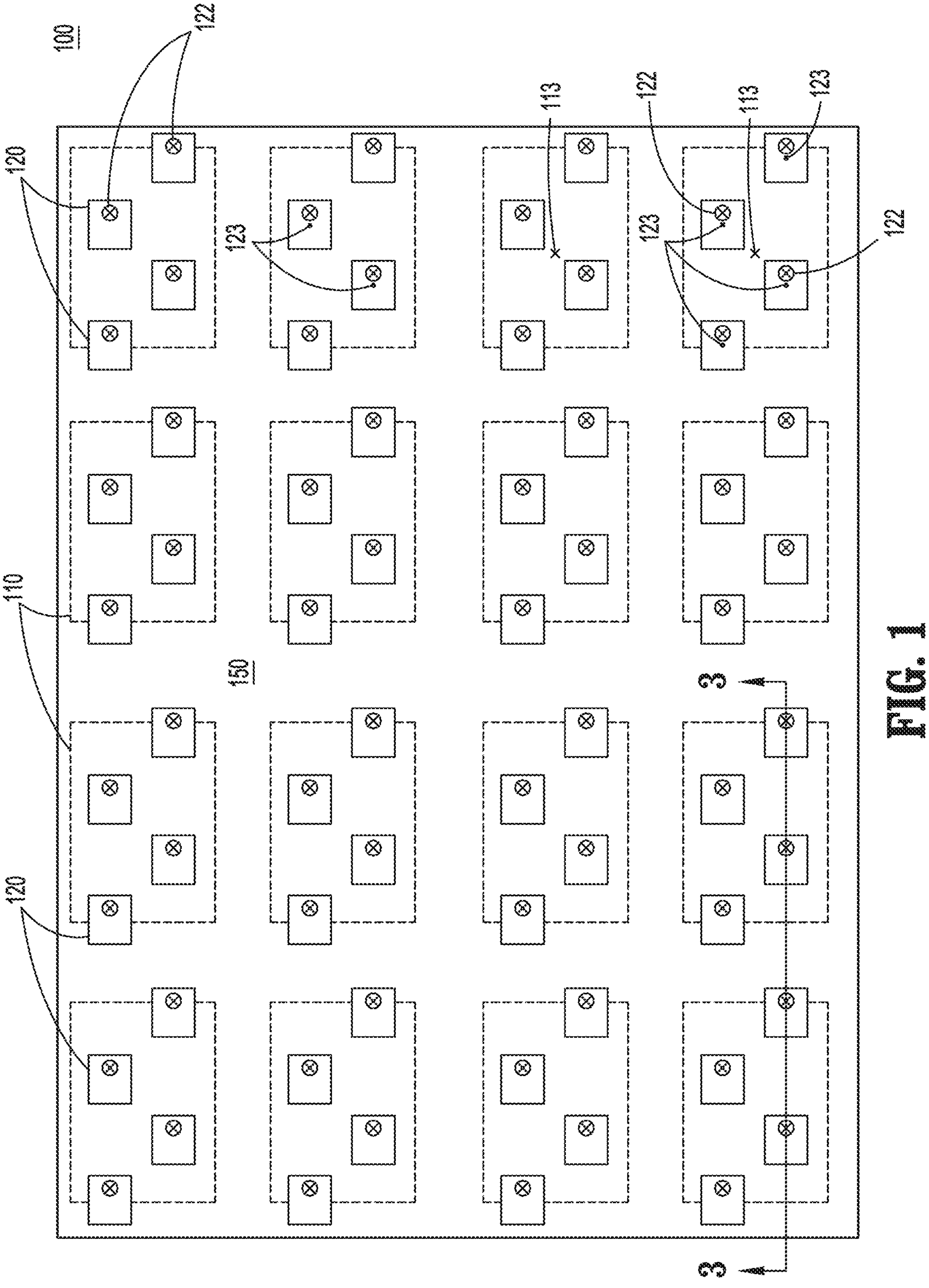
FIG. 1 is a plan view of an example antenna apparatus according to an embodiment.

FIG. 1 is a top plan view of an example antenna apparatus, 100, according to an embodiment. Antenna apparatus 100 may be constructed in a thin, stacked structure with an upper component layer comprising a plurality of antenna elements 120 forming an antenna array in a first plane, a lower component layer comprising a plurality of radio frequency integrated circuit chips (RFICs) 110 arranged in a second plane parallel to the first plane, and coupled to antenna elements 120. A substrate 150 may be disposed between the upper and lower component layers. A ground plane (not shown) for reflecting signal energy from/to antenna elements 120 may be printed on the lower surface of substrate 150. With such a multi-layered structure having integrated antenna elements 120 and RFICs 110, antenna apparatus 100 may be referred to as an embedded antenna array. In the following discussion, for convenience of description, the horizontal plane/direction will generally refer to the plane/direction parallel to the major surfaces of antenna apparatus 100 and the vertical direction will be refer to the orthogonal direction, i.e., the thickness direction of antenna apparatus 100.

Antenna elements 120 may each be a microstrip patch antenna element printed on substrate 150 and electrically or electromagnetically coupled to ("fed from") an RFIC 110 at a respective feed point 122. RFICs 110 may be mechanically connected to substrate 150 by solder bump connections or the like to the ground plane and other connection pads located on substrate 150. Each RFIC 110 may include transmitting and/or receiving RF front end circuitry including amplifiers, phase shifters and filters. (Herein, RF front end circuitry may be interchangeably called "beamforming" circuitry.) With RF front end amplifiers distributed across the antenna array in this manner, antenna apparatus 100 may be referred to as an active antenna array. In some embodiments, each RFIC 110 includes receive circuitry comprising at least one low noise amplifier (LNA) for amplifying a receive signal, and at least one power amplifier (PA) for amplifying a transmit signal. If antenna apparatus 100 is designed as a phased array, each RFIC 110 may include at least one dynamically controllable phase shifter for steering a receive beam and/or a transmit beam.

In one example, antenna apparatus 100 is configured for operation over a millimeter (mm) wave frequency band, generally defined as a band within the 30 GHz to 300 GHz range. In other examples, antenna apparatus 100 operates in a microwave range from about 1 GHz to 30 GHz, or in a sub-microwave range below 1 GHz. Herein, a radio frequency (RF) signal denotes a signal with a frequency anywhere from below 1 GHz up to 300 GHz. It is noted that an RFIC configured to operate at microwave or millimeter wave frequencies is often referred to as a monolithic microwave integrated circuit (MMIC), and is typically composed of III-V semiconductor materials.

Antenna elements 120, when embodied as microstrip patches, may have any suitable shape such as square, rectangular, circular, elliptical or variations thereof, and may be fed and configured in a manner sufficient to achieve a desired polarization, e.g., circular, linear, or elliptical. The number of antenna elements 120, their type, sizes, shapes, inter-element spacing, and the manner in which they are fed may be varied by design to achieve targeted performance metrics. While FIG. 1 depicts an example with 64 antenna elements 120, in a typical embodiment antenna apparatus 100 includes hundreds or thousands of antenna elements 120. In embodiments described below, each antenna element

120 is a microstrip patch fed with a probe feed. The probe feed may be implemented as a through substrate via (TSV) ("via") that electrically connects to an input/output (I/O) pad of an RFIC 110. An I/O pad is an interface that allows signals to come into or out of the RFIC 110. In other examples, an electromagnetic feed mechanism is used instead of a via, where each antenna element 120 is excited from a respective feed point with near field energy.

In antenna apparatus 100, the RFICs 110 are arranged in a first lattice geometry whereas the antenna elements 120 are arranged in a second (different) lattice geometry. In FIG. 1 and other examples herein, the first lattice geometry is rectangular (herein, "square" is a subset of "rectangular") and the second lattice geometry is non-rectangular, e.g., triangular, but other combinations are possible in other embodiments. A non-rectangular antenna array lattice geometry (e.g., triangular) can provide desirable performance benefits, such as allowing a wider spacing of antenna elements 120 with grating-lobe free performance as compared to a rectangular lattice. Mutual coupling between antenna elements 120 can also be beneficially reduced in a triangular lattice as compared to a rectangular lattice configuration.

In any case, although RFICs 110 and antenna elements 120 are arranged in different respective lattice geometries, each feed point 122 is aligned in the vertical direction with a corresponding I/O pad of an RFIC 110 connected to that feed point. For instance, the region of each feed point 122 in FIG. 1 is represented as an "o", and the "x" within each "o" represents the connected RFIC 110 I/O pad; thus, in the vertical direction the feed point 122 overlays the I/O pad. In other words, the I/O pads of various RFICs 110 arranged in a horizontal plane define a pattern matching the pattern of the feed points 122. This matching arrangement shortens the distance between each feed point 122 and corresponding I/O pad, and obviates the need for lossy transmission lines traversing horizontally therebetween. Conventionally, these transmission lines are formed within multi-layer connections between the RFICs 110 and the antenna substrate 150. This is partly because the I/O pads on standard RFICs are arranged symmetrically adjacent to opposite edges of their rectangular footprints. The present embodiments allow for the elimination of such multi-layer connections and a reduction/elimination of losses otherwise caused by such transmission lines.

In FIG. 1, locations of the feed points 122 and I/O pads of RFICs 110 are shown vertically aligned. As used herein, "alignment" of a feed point and a connected I/O pad can be either an exact alignment (within a manufacturing tolerance range) or a "substantial alignment" in which a slight offset is built in for purposes of manufacturability (discussed later). FIG. 1 also illustrates a case in which each RFIC 110 is coupled to four antenna elements 120. In other embodiments, each RFIC 110 is coupled to more or fewer antenna elements 120. It is also noted here that in some embodiments, each of the antenna elements 120 is shared for transmit and receive operations and each RFIC 110 includes suitable transmit/receive (T/R) circuitry for isolating signals in transmit and receive paths therein. However, in other antenna systems, two separate antenna arrays 100 are employed—one for transmit and one for receive. In this case, all of antenna elements 120 of a given antenna array 100 are either "receive antenna elements" dedicated for receive operations or "transmit antenna elements" dedicated for transmit operations.

Figure 2:
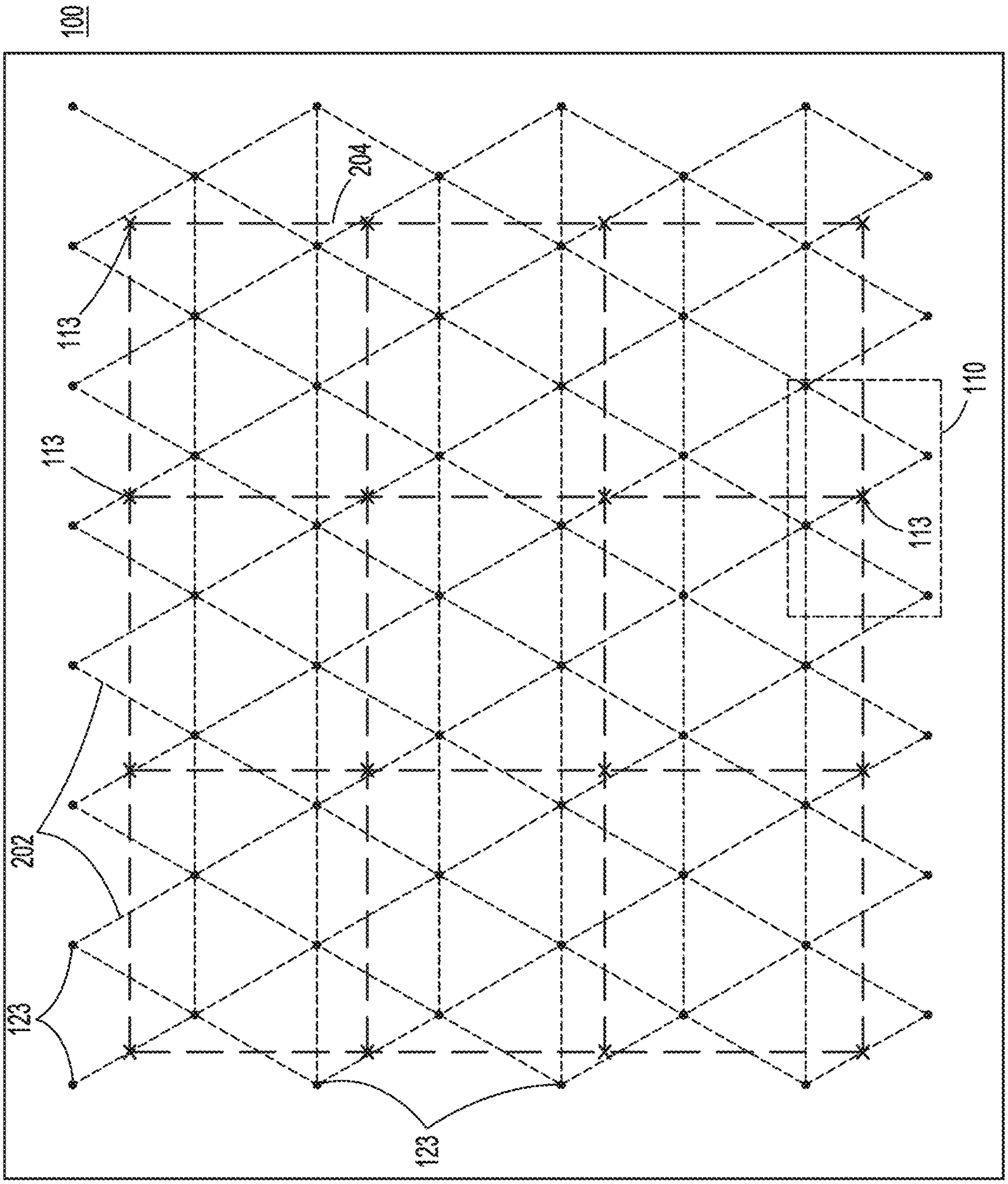
FIG. 2 is a diagram illustrating example lattice geometries of antenna elements and RFICs in the antenna apparatus of FIG. 1.

The respective lattice geometries may be defined by center points 123 of the antenna elements 120 and center points 113 of the RFICs 110. (Note that feed points 122 may be offset from respective center points 123 of the antenna elements 120.) Referring to FIG. 2, imaginary lines connecting center points 123 results in a triangular lattice 202 for the antenna elements 120. Imaginary lines connecting center points 113 of RFICs 110 results in a rectangular or square lattice 204 for the RFICs 110. As seen in FIG. 1, for the case of four antenna elements 120 coupled to one respective RFIC 110 in such lattice arrangements, in any given RFIC 110, two I/O pads (the x's within feed points 122) are situated at opposite edges of the RFIC and the other two I/O pads are situated inwardly from the opposite edges. In general, when each RFIC 110 in a rectangular lattice is coupled to at least two antenna elements 120 in a non-rectangular lattice, some of the RFIC I/O pads may be located at opposite edges of the RFIC 110 and remaining I/O pads are located inwardly from these opposite edges. This I/O pad arrangement differs from standard RFICs (having rectangular footprints) which typically have all their I/O pads (including "G" ports of ground-signal-ground ("GSG") or ground-signal ("GS") connection sets, discussed later) located proximate to opposite edges. As a result, when standard RFICs are arranged in a rectangular lattice and coupled to antenna elements in a non-rectangular lattice, some or all of the feed point locations are misaligned with the I/O pad locations. This in turn complicates the design by requiring horizontally oriented transmission lines, and makes the interconnections between the RFICs and antenna elements difficult and lossy. The present embodiments, which employ aligned feed points and I/O pads, avoid such complexity and transmission line losses.

Figure 3:
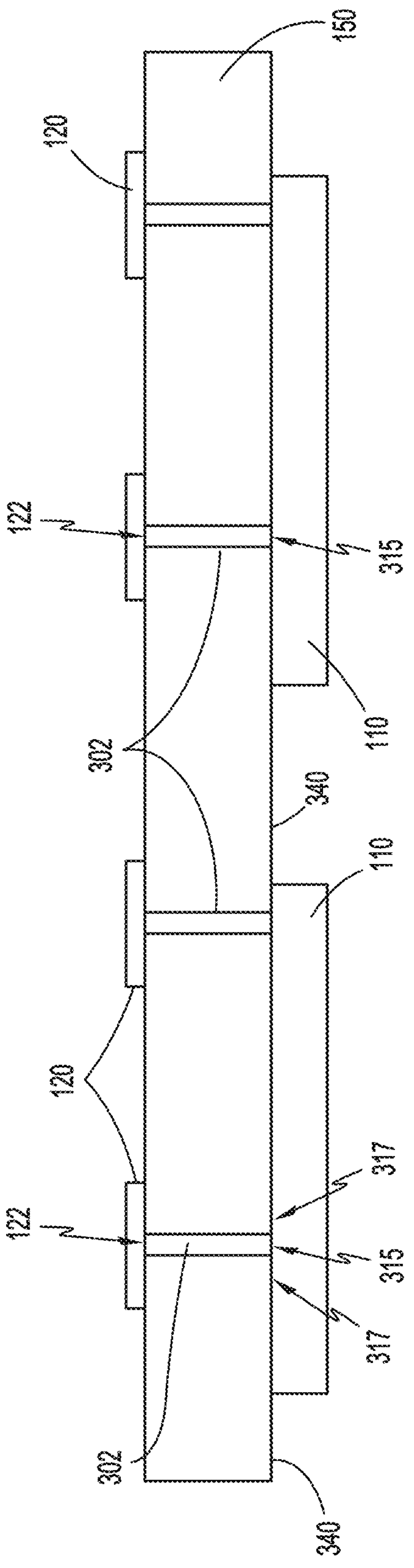
FIG. 3 is a cross-sectional view of a portion of the antenna apparatus along the lines 3-3 of FIG. 1.

FIG. 3 is a simplified cross-sectional view of a portion of antenna apparatus 100, depicting an example structure along two adjacent RFICs 110 of FIG. 1. A plurality of vias 302 are formed within substrate 150, each connecting a feed point 122 of an antenna element 120 to an RFIC 110 I/O pad (not shown in FIG. 3) at an I/O pad location 315. Hereafter, an I/O pad location 315 is assumed to be a central location of the I/O pad. Detailed examples of an I/O pad are described later.

A ground plane 340 may be printed on the lower surface of substrate 150. Since the feed point 122 locations and the corresponding I/O pad locations 315 are vertically aligned, one or more redistribution layers with horizontally oriented transmission lines between RFICs 110 and substrate 150 can be avoided. Thus, RFICs 110 may be attached directly to connection points at substrate 150 and ground plane 340. In addition, the alignment of the I/O pad locations 315 with the corresponding feed point locations 122 reduces the complexity of the antenna substrate 150 (including the number of board layers needed.) Note that the number of dielectric and conductive layers in antenna substrate 150 can vary from embodiment to embodiment. It is further noted that in some embodiments, each antenna element 120 may have two feed points that connect through two vias 302 to two respective I/O pads of an RFIC 110 to generate circular polarization in some designs. Designs for antenna element 120 described hereinbelow, however, achieve circular polarization utilizing a single feed. Further, if GSG connections are made, ground pads of RFICs 110 may be connected to ground plane 340 at locations 317 on opposite sides of vias 302. Alternatively, GS connections are used in which a single ground pad to ground plane 340 connection is made on just one side of a via 302.

Figure 4A:
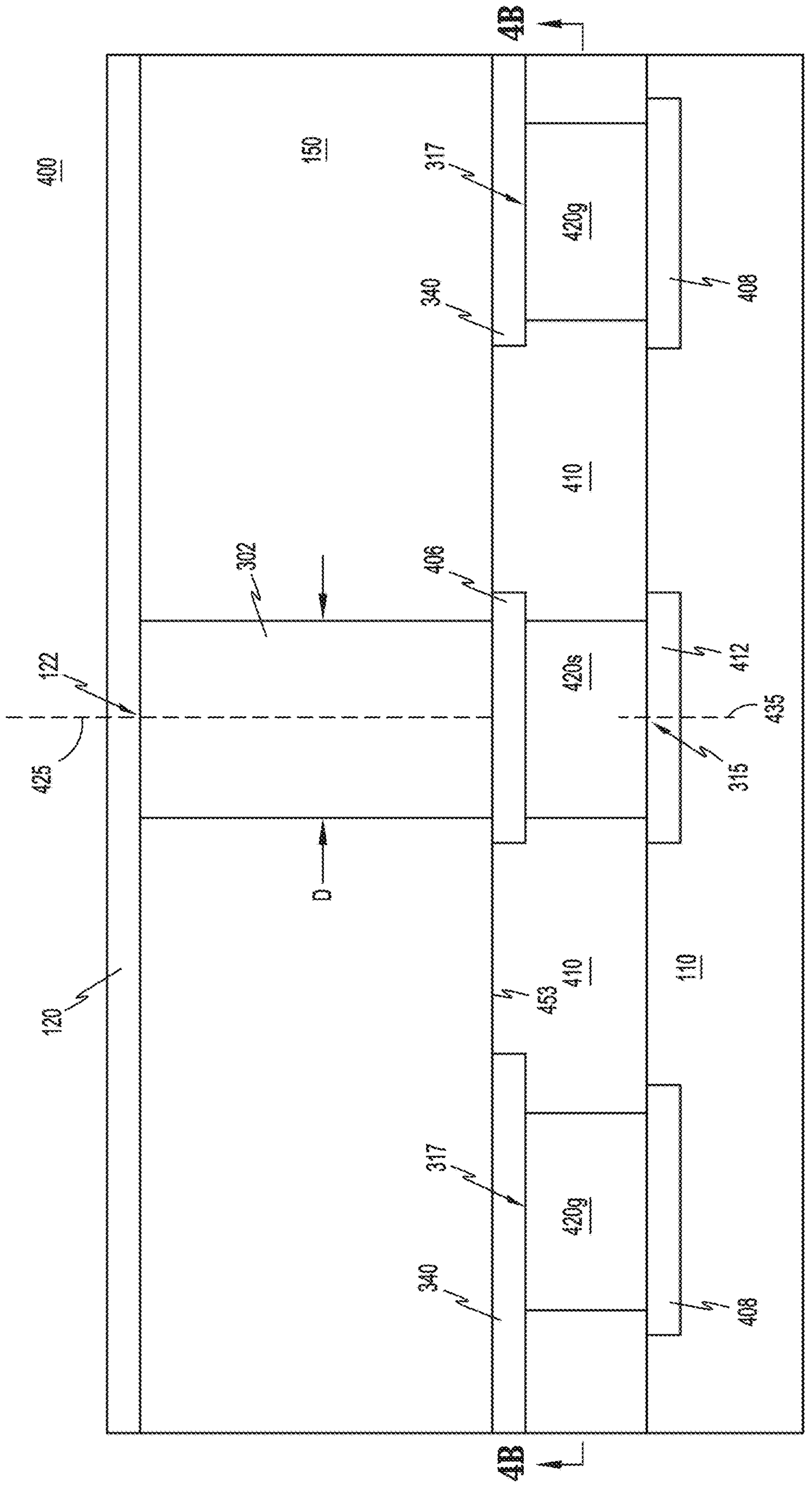
FIG. 4A is a cross-sectional view of an example connection structure between an antenna element and an RFIC in the antenna apparatus.

FIG. 4A is a cross-sectional view of an example connection structure, 400, between one antenna element 120 and an RFIC 110 in antenna apparatus 100. In this embodiment, an "exact" vertical alignment of a feed point 122 and a touch pad location 315 is targeted by design through a connection via 302. (Due to manufacturing tolerances as discussed below, a prescribed range of horizontal offset may be allocated even in this "exact alignment" case.) Via 302 electrically contacts antenna element 120 at feed point location 122 and extends through antenna substrate 150 to couple antenna element 120 to a catch pad 406 on bottom surface 453 of substrate 150. The feed point 122 location is the center of the electromagnetic interface with antenna element 120. In the illustrated example, via 302 directly contacts antenna element 120 and thus the feed point 122 is at the center of the top surface of via 302. In other embodiments in which antenna element 120 does not physically contact a via but is capacitively coupled to a slot, the feed point location may be at the optimal coupling location of the slot.

For instance, via 302 may be cylindrical and have a diameter D about a central axis 425, and a junction of axis 425 and antenna element 120 defines the feed point 122 location. (If via 302 has an elliptical cross section, D may represent a distance across any cross-section of the ellipse.) Catch pad 406 may be deposited and patterned conductive material that can have a footprint with a diameter or width about the same as or slightly larger than diameter D for manufacturing tolerance purposes. RFIC 110 has an I/O pad 412 which connects to catch pad 406 through an electrical connection joint 420*s* (where "s" denotes a "signal" line connection). This connection permits signal communication between antenna element 120 and beamforming circuitry (not shown) within RFIC 110. I/O pad 412 may be cylindrical, oval or rectangular about a central axis 435. The I/O pad location 315 may be defined as a location along central axis 435. In the exact alignment example of FIG. 4A, a desirable alignment tolerance between axis 435 and axis 425 (i.e., an allowable horizontal offset due to manufacturing variations) may be about ¼ D. With such a minimal or zero offset, for a given thickness of antenna substrate 150 and conductive joining material (the thickness of connection joint 420*s*), the length of the signal path between the feed point 122 location and I/O pad location 315 is minimized. This allows antenna element 120 to be directly connected to RFIC 110 through via 302 and the conductive joining material (e.g. solder) of connection joint 420*s*, without the need for additional transmission lines or multi-layer connections. One example of a via 302 diameter D for millimeter wave designs is in the range of 50-100 um. A typical alignment accuracy of an RFIC 110 in the exact alignment case may be about 5 um. In a mm wave design, an example of a diameter or width of an antenna element 120 is in the range of 1-2 mm, with element to element spacing in the range of about 2-4 mm in each of X and Y directions. An RFIC 110 may have a length and width each in the range of about 4-6 mm. The thickness (height as seen in FIG. 4A) of each of RFIC 110 and underfill layer 410 may be on the order of 3 mm, and the thickness of antenna substrate 150 may be on the order of 10 mm. All of the above dimensions are exemplary to appreciate the small scale typical for millimeter wave applications, and may be varied by design and/or according to frequency and manufacturing accuracy.

Figure 4B:
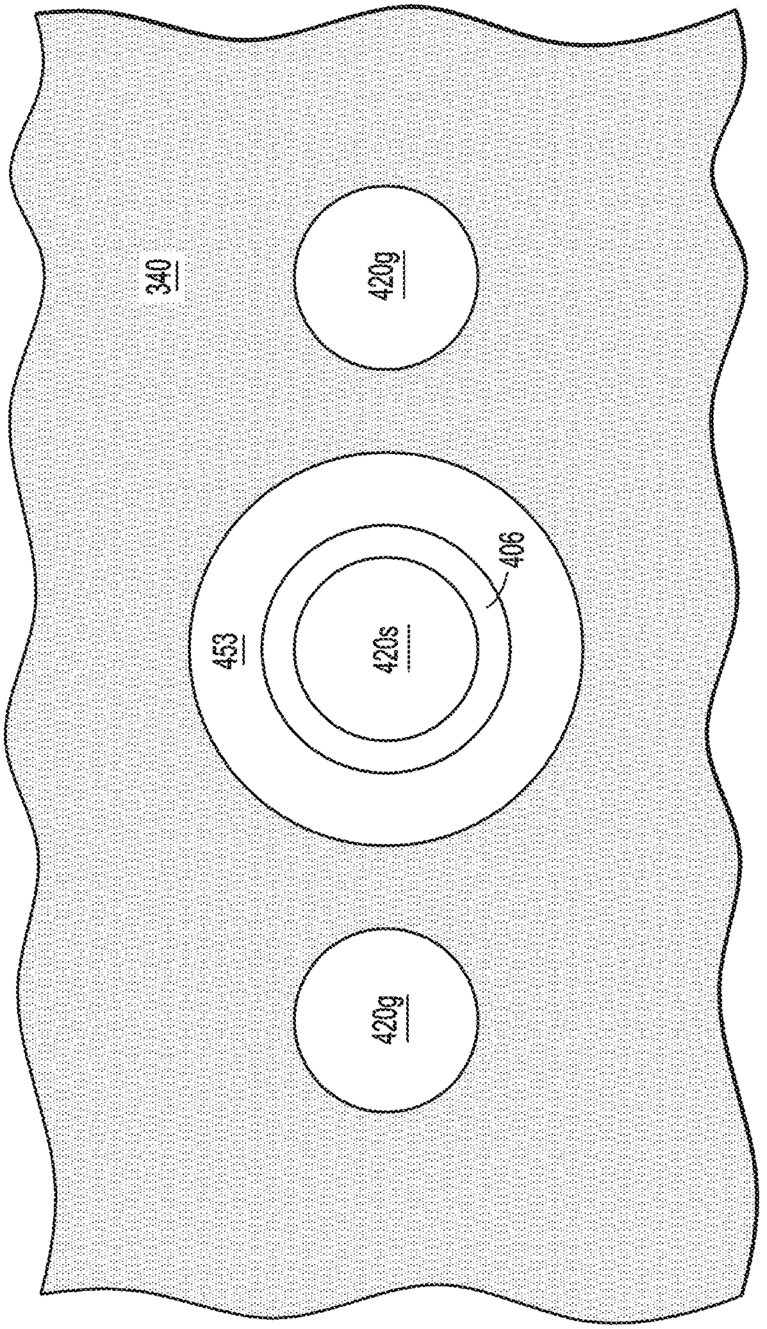
FIG. 4B is a cross-sectional view taken along the lines 4B-4B of FIG. 4A, illustrating a ground-signal-ground connection arrangement.

FIG. 4A also illustrates a GSG connection example, in which a ground connection is made at two locations 317 on opposite sides of the above-described signal line connection with connection joint 420*s*. Each ground connection is made by connecting a ground pad 408 of RFIC 110 to ground plane 340 at a location 317 through a ground connection joint 420*g*. An isolation layer 410 may be comprised of underfill material surrounding each of connection joints 420*s* and 420*g* to provide mechanical support to connection joints 420*s*, 420*g* and thereby improve reliability. A typical underfill material may be a mixed material composed mainly of amorphous fused silica. In other embodiments, underfill material is omitted, whereby the isolation layer 410 just represents air. To isolate via 302 from ground plane 340, a region of ground plane 340 surrounding catch pad 406 is cut away to expose a lower surface 453 of antenna substrate 150. This feature may best be seen in FIG. 4B, which is a cross-sectional view through the connection joints 420*s*, 420*g* looking towards substrate 150 (with isolation layer 410 removed for clarity). Some examples of connection joints 420*s* and 420*g* are copper pillar connection joints, solder joints (e.g. formed from solder balls) and gold to gold bumping connections. As mentioned earlier, an alternative embodiment may employ a GS connection with just a single ground connection on one side of the signal connection. A GSG connection design provides more isolation than a GS design and reduces stray radiation, but is more complex. A GSG connection may have three or more ground connection joints 420*g* in some designs, but a practical implementation has two connection joints 420*g*.

In FIG. 4A and other figures herein, antenna substrate 150 is depicted as a single layer substrate. In other embodiments, antenna substrate 150 is a multi-layer substrate with a patterned metal layer to provide some chip to chip RF routing between RFICs 110 and/or connections between DC lines on RFIC 110. In this metal layer, metal has been removed in the regions of the vias 302 to permit a direct connection between the RFIC 110 and antenna element 120. It is further noted here that while a single I/O pad 412 is depicted in FIG. 4A, in other embodiments two or more I/O pads 412 connect to each antenna element 120 in an alternative scheme for achieving circular polarization.

Figure 5:
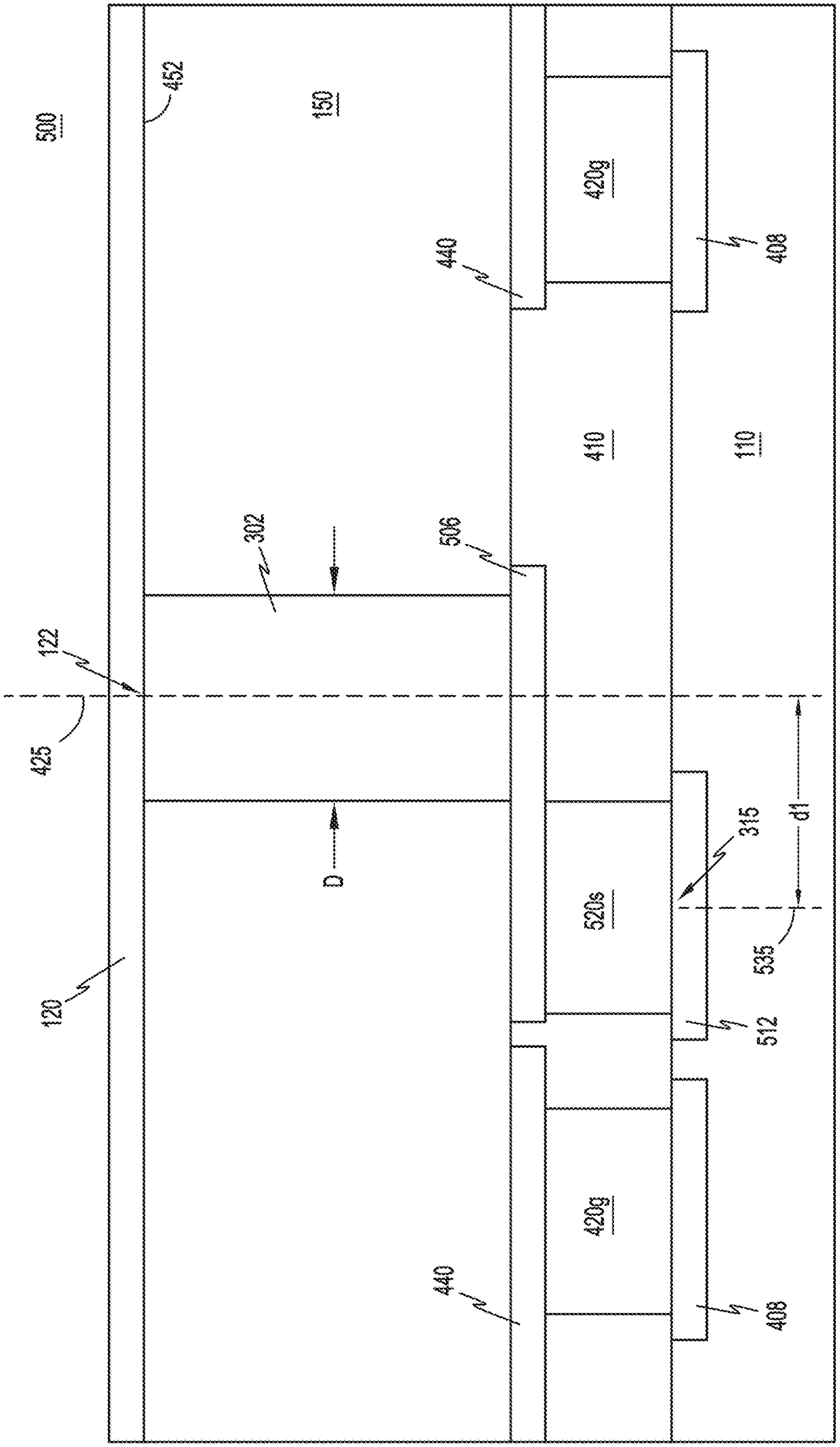
FIG. 5 is a cross-sectional view of another example connection structure between an antenna element and an RFIC in the antenna apparatus.

FIG. 5 is a cross-sectional view of another example connection structure, 500, between an antenna element 120 and an RFIC 110. In this example a feed point 122 is "substantially aligned" but not exactly aligned with an I/O port location 315 of RFIC 110. (This case may also be considered a subset of an "aligned" configuration as noted earlier.) To this end, a wider catch pad 506 extends beneath via 302, and via 302 connects to only a first portion of catch pad 506. A signal connection joint 520*s* underlies a second portion of catch pad 506 beyond the first portion. Thus, a connection joint 520*s* does not directly underlie via 302. This approach is advantageous in the case where the process for forming the connection via 302 results in a non-planar bottom surface of via 302, which can be translated to the bottom surface of the catch pad. For instance, in the configuration of FIG. 4A, if catch pad 406 has a non-planar bottom surface, the reliability of connection joint 420*s* may be lower than desired. In FIG. 5, reliability is improved by substituting the extended catch pad 506, which may have a non-planar bottom surface in the right hand portion below via 302 but has a planar bottom surface on the left hand side. As a result, a more reliable connection to the connection joint 520*s* may be formed. RFIC 110 in this case includes an I/O pad 512 that is symmetrical about a central axis 535. Central axis 425 of via 302 is horizontally offset from axis 535 by a distance d1, where a typical value of d1 may be about D (the diameter of via 302). Although an offset exists between feed point 122 location and I/O pad location 315, because the offset is small the two locations are considered aligned. For instance, in terms of wavelengths, a maximum value for the offset d1 may be 0.02 wavelengths at the operating frequency of antenna apparatus 100, which may have a negligible electrical effect on antenna performance as compared to the exact alignment embodiment of FIG. 4A.

Figure 6:
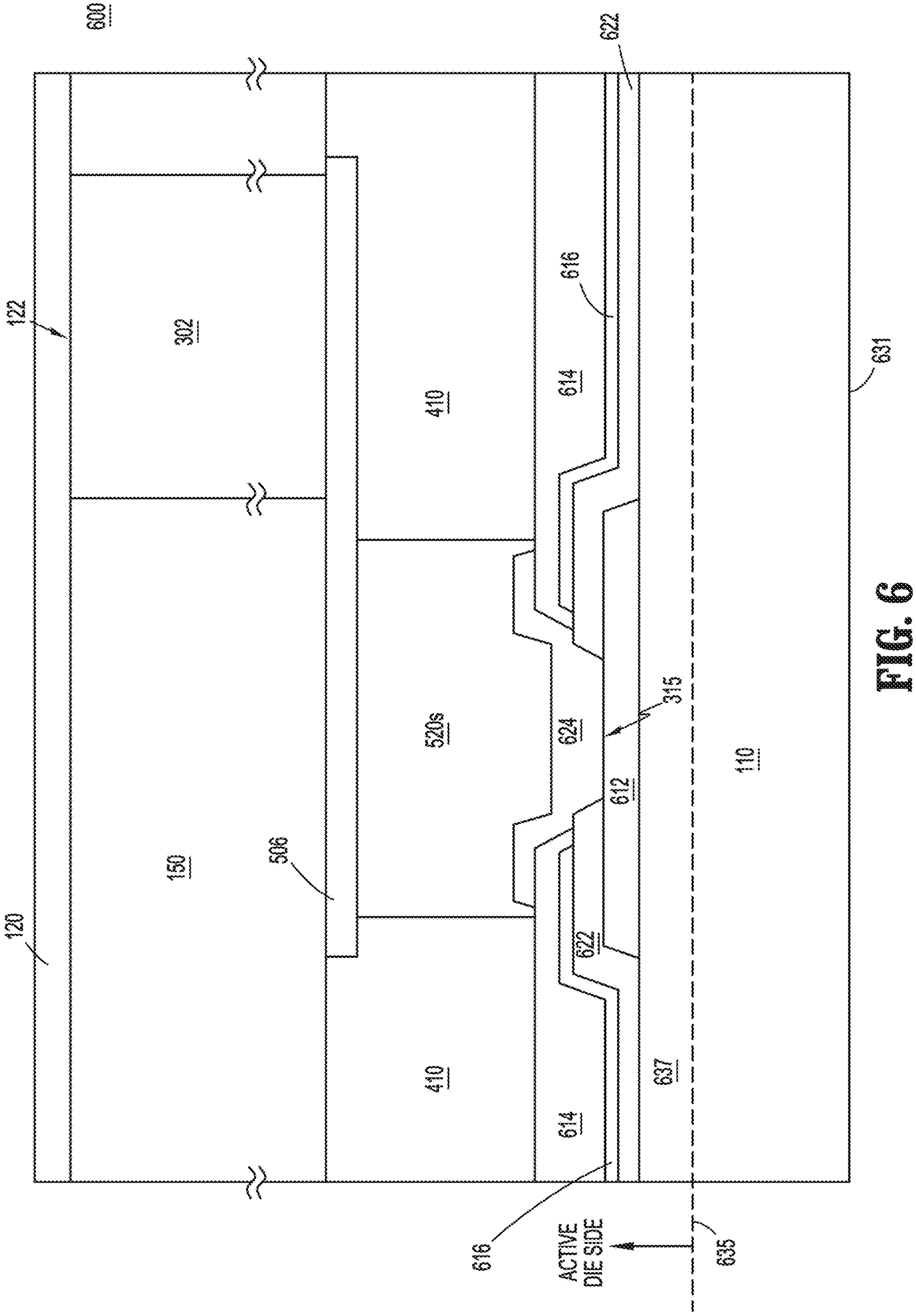
FIG. 6 illustrates a cross-sectional view of an example flip chip connection between an antenna element and an RFIC in the antenna apparatus.

FIG. 6 illustrates a cross-sectional view of an exemplary detailed connection structure 600 between an antenna element 120 and an RFIC 110 within antenna apparatus 100. The illustrated connection structure 600 is an example of connection structure 500 of FIG. 5 and illustrates a closely aligned flip-chip type connection in which a via 302 is slightly offset horizontally from a center point 315 of an I/O pad 612 of RFIC 110. Alternatively, via 302 may be exactly aligned with I/O pad 612, and in this case the configuration would be a detailed example of connection structure 400 of FIG. 4. RFIC 110 may be a semiconductor die composed of III-V materials for microwave and millimeter wave designs, or silicon for lower frequencies. Some examples of III-V materials include indium phosphide (InP), gallium arsenide (GaAs), silicon germanium (SiGe) and gallium nitride (GaN). An active die side region 637 of RFIC 110, e.g., the upper region of RFIC 110 above imaginary line 635, faces toward antenna element 120. Active die side region 637 may include doping regions of transistors used in beamforming circuitry, e.g., low noise amplifiers, power amplifiers, T/R switches, phase shifters, etc. A lower surface 631 may be plated with metal and used as a ground for the internal circuitry of RFIC 110.

A surface finish metal layer 624 such as Electroless Nickel Electroless Palladium Immersion Gold (ENEPIG) may be present between I/O pad 612 and connection joint 520*s* to help liquefiable metal (e.g. solder) of connection joint 520*s* to adhere to I/O pad 612. Layer 624 may have been formed in the general shape of an upside down truncated cone, with a central cavity on a top surface thereof to provide a more reliable connection interface. When a solder ball or other metal structure is placed and then liquified atop layer 624 in a flip-chip connection formation process, a portion of the liquid metal fills the upper cavity. This helps to form connection joint 520*s* as a robust connection between catch pad 506 and I/O pad 612. In the example of FIG. 6, a metal routing layer 616 serves as a redistribution layer to make connections between circuit points within RFIC 110 and/or between different RFICs 110. To this end, a first polymer overcoat layer 622 such as Benzocyclobutene (BCB) may have been formed between a top surface of RFIC 110 and metal routing layer 616, and a second polymer overcoat layer 614 may have been formed between metal routing layer 616 and isolation layer 410. Layers 622 and 614 provide isolation and support for metal routing layer 616. The material of layer 622 may overlap a peripheral portion of I/O pad 612 as illustrated. If metal routing layer 616 is omitted, the first polymer overcoat layer 622 may still be present on the top surface of RFIC 110. Isolation layer 410 surrounds connection joint 520*s* and extends between overcoat layer 614 and the lower surface of antenna substrate 150. A similar connection structure may be provided for connecting ground pads 408 to a ground plane 440 (both not shown in FIG. 6). That is, ground pads 408 may each be constructed similarly to I/O pad 612, and a surface finish metal layer 624 may be present between each ground pad 408 and a corresponding connection joint 420*g*, akin to connection joint 520*s* in FIG. 6.

The flip-chip connection configuration of FIG. 6, while satisfactory for providing a short, aligned connection between the feed point 122 and I/O pad 612, may exhibit a side effect of signal loss caused by interfacing the polymer overcoat layer 622 with the active die side of RFIC 110. Another possible side effect is due to the proximity between the active die side region 637 and the antenna ground plane 440 (seen in FIG. 4) located between isolation layer 410 and antenna substrate 150. This causes a risk of oscillations due to reflections between ground plane 440 and the circuitry within active die side region 637.

Figure 7A:
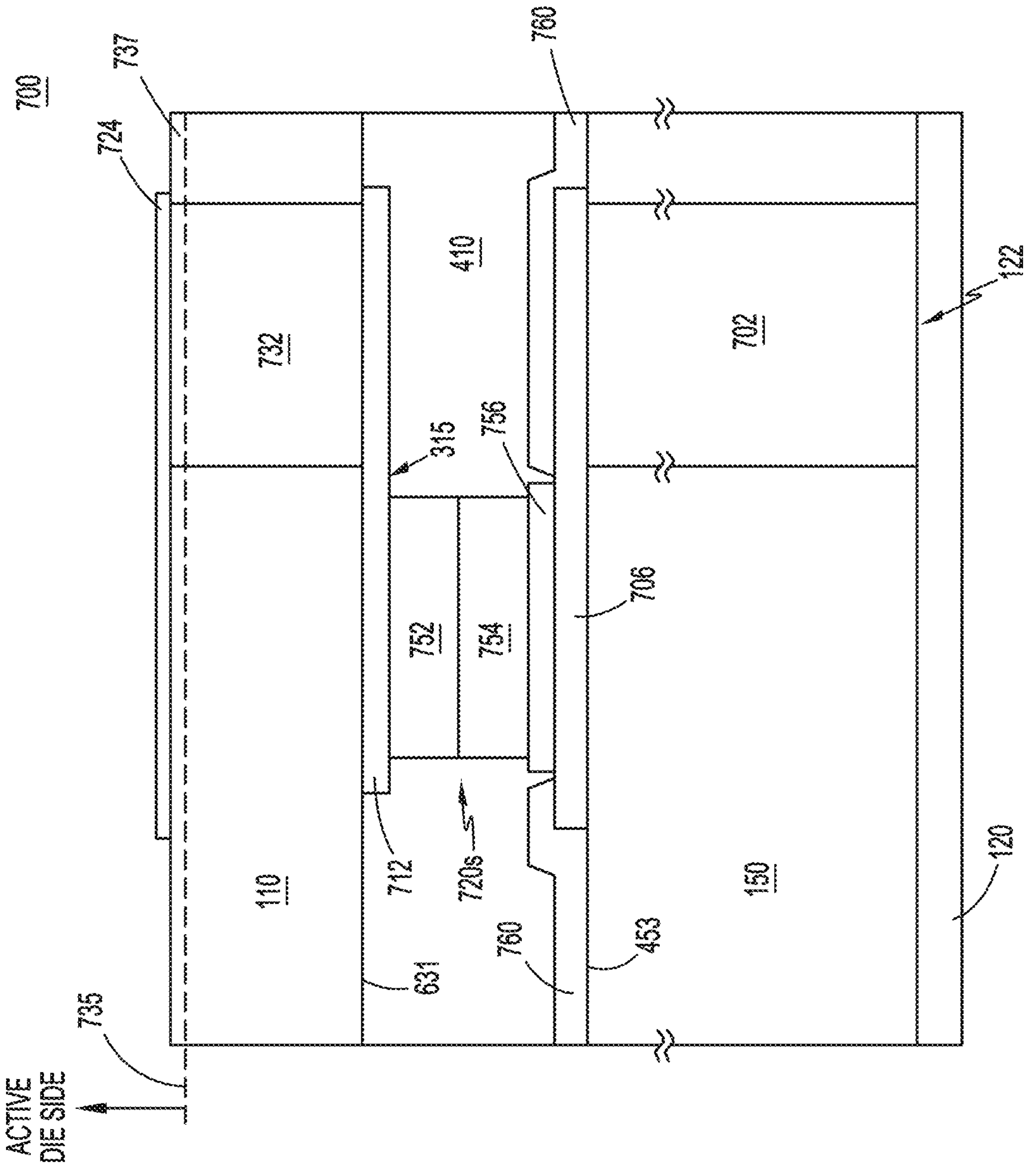
FIG. 7A is a cross-sectional view of an example dual via type connection between an antenna element and an RFIC in the antenna apparatus.

FIG. 7A is a cross-sectional view of an example dual via type connection structure 700 between an antenna element 120 and an RFIC 110 in antenna apparatus 100. (Connection structure 700 is shown flipped 180° with respect to those of FIGS. 3-6.) Connection structure 700 differs from structure 600 of FIG. 6 in that an active die side of RFIC 110 does not interface with a polymer layer, whereby loss that otherwise occurs due to such an interface is avoided. In addition, the connection structure is less likely to cause oscillations due to reflections between the antenna ground plane and the active die side region of RFIC 110, since these regions are further apart and do not face each other.

RFIC 110 in FIG. 7A has an active die side region 737 above imaginary line 735. A first via 732 formed through the die of RFIC 110 electrically connects to a conductive trace 724 at a local region of the active die side region 737. The local region may be a conductive I/O node of beamforming circuitry within RFIC 110, and conductive trace 724 may connect to another circuit point or points of the beamforming circuitry. First via 732 may be called a "hot via" because it is not electrically connected to ground. First via 732 connects on the opposite end to an I/O pad 712 situated on the lower surface of RFIC 110 opposite the active side region 737. I/O pad 712 in turn connects to antenna element 120 at feed point 122 through a series of conductors. These may include a copper pillar 752 or gold/solder bump, a solder cap 754 (or other liquefiable metal cap), a surface finish metal layer 756 such as ENEPIG, a catch pad 706, and a second via 702 formed through antenna substrate 150. A signal connection joint 720*s* includes copper pillar 752 and solder cap 754, where copper pillar 752 may have been formed by growing copper up into a pillar, to which solder cap 754 was applied to produce signal connection joint 720*s* as a solder connection. Catch pad 706 is formed on rear surface 453 of substrate 150 and may be similar to catch pad 506 of FIG. 5. A passivation layer 760, e.g., a quartz polymer layer, may surround the surface finish metal layer 756 and may have been formed partly on substrate surface 453 and partly on an exposed surface of catch pad 706. As described below in the example of FIG. 7B, one or more passivation layers 760 may act as an insulator between ground plane 440 and one or more redistribution metal layers between substrate 150 and RFIC 110.

For example, when via 702 is formed, it may result in a non-planar surface near surface 453 of substrate 150, which may be translated to the adjacent region of catch pad 706. Thus, catch pad 706 may be designed horizontally extended as shown so that the connection joint region to RFIC 110 (layers 756, 754 and 752) may have higher strength and reliability. The same is applicable to via 732 and catch pad 712. Since the horizontal extensions of catch pad 706 and 712 may be similar, the feed point 122 may be substantially or exactly aligned with the I/O pad 712 location 315 (i.e., aligned as defined earlier). Further, even if catch pads 706 and 712 are not designed to extend in the same direction, since the offsets between the respective vias 702, 732 and a central axis of connection joint 720*s* are small (e.g., less than 0.02 wavelengths), the I/O pad location 315 and antenna feed point 122 would still be aligned.

Isolation layer 410 (with or without underfill material) may be disposed between passivation layer 760 and lower surface 631 of RFIC 110. If isolation layer 410 is comprised of underfill, since the underfill does not interface with the active die region 737 of RFIC 110, signal loss that would otherwise be caused by the interface is avoided. In addition, the likelihood of oscillations is reduced as compared to connection structure 600 of FIG. 6. This is because active die side region 737 is located further away from ground plane 440 (not shown in FIG. 7 but located between surface 453 of substrate 150 and isolation layer 410 as seen in FIGS. 4A, 4B, 5 and 7B). Moreover, a ground surface acting as a ground for beamforming circuitry within RFIC 110 may be present at the lower surface 631 of RFIC 110, further diminishing the risk of oscillations.

Figure 7B:
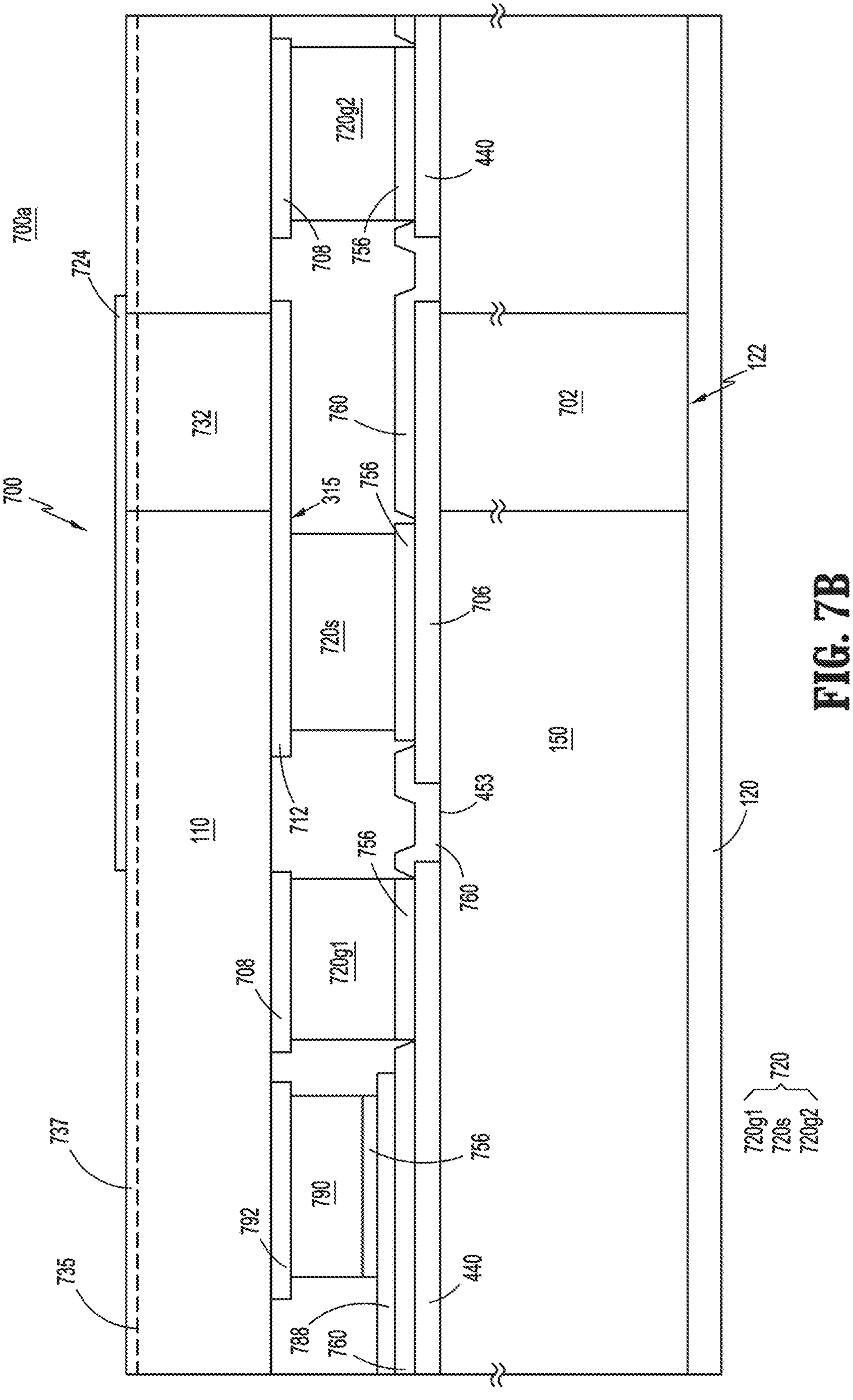
FIG. 7B is a cross-sectional view of an exemplary portion of the antenna apparatus depicting an example expanded connection structure encompassing the dual via type connection of FIG. 7A.

FIG. 7B is a cross-sectional view of an exemplary portion of antenna apparatus 100 depicting an example expanded connection structure encompassing the dual via type connection of FIG. 7A. Connection structure 700*a* includes the above-described connection structure 700, with first and second ground connection joints 720*g*1 and 720*g*2 on opposite sides, collectively forming a GSG connection set 720. Each of ground connection joints 720*g*1 and 720*g*2 may have the same type of construction and similar dimensions as signal connection joint 720*s*. Ground connection joints 720*g*1 and 720*g*2 may each electrically connect a respective local region of a ground surface 708 of RFIC 110 to a connection point on ground plane 440. Local surface finish layers 756 may have been applied to ground plane 440 to help ground connection joints 720*g*1, 720*g*2 adhere to ground plane 440.

FIG. 7B also illustrates a redistribution layer (RDL) 788 that may be present between RFIC 110 and ground plane 440. Redistribution layer 788 may be used to connect circuit points within RFIC 110 and/or circuit points of different RFICs 110, typically to route DC bias between circuit points. RDL 788 is formed on a region of passivation layer 760, which isolates it from ground plane 440. A connection joint 790 that may have the same type of construction as signal connection joint 720*s* may connect an I/O pad 792 of RFIC 110 to RDL 788. RDL 788 may extend horizontally and connect to another I/O pad of RFIC 110 (not shown) or of a different RFIC 110 through another connection joint 790 to route signals/DC voltages between different circuit points of RFIC(s) 110. If at least one additional RDL 788 is added to the antenna apparatus 100 configuration, additional passivation layers 760 may be disposed on one or more sides of each additional RDL to provide necessary isolation between RDLs.

Figure 8A:
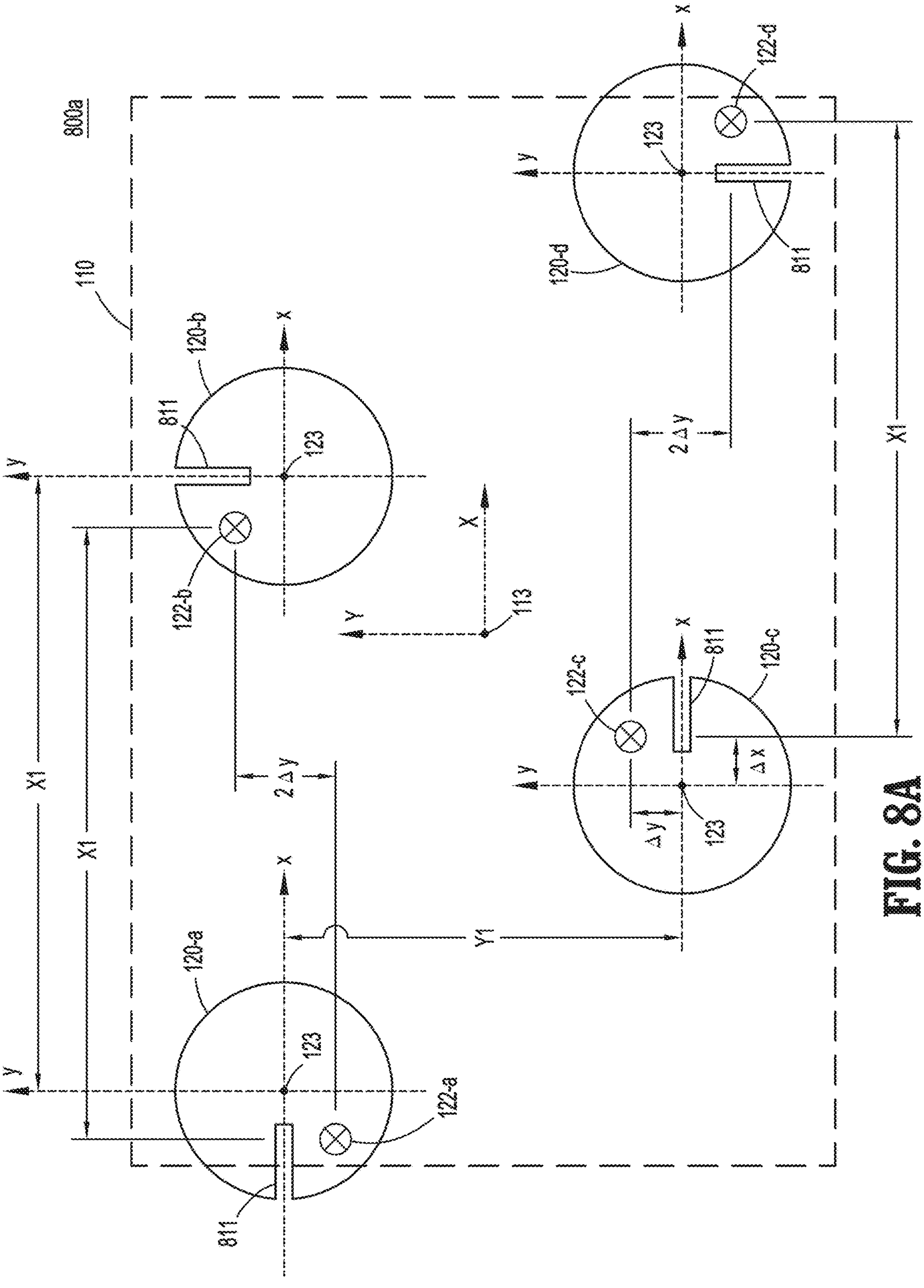
FIGS. 8A, 8B and 8C illustrate respective examples of arrangements of antenna feed locations with respect to a coupled RFIC.

FIG. 8A illustrates an example arrangement 800*a* of antenna element feed point locations with respect to a coupled RFIC in antenna apparatus 100. In this example, an RFIC 110 is coupled to four antenna elements 120-*a*, 120-*b*, 120-*c* and 120-*d* arranged as part of a triangular lattice, with respect to center points 123 of the antenna elements. Center points 123 may also be referred to herein interchangeably as phase centers 123 of the respective antenna elements. RFIC 110 is arranged as part of a rectangular lattice as previously illustrated in FIGS. 1 and 2. Antenna elements 120-*a* to 120-*d* are each exemplified as a circular patch element with a slit 811 (an elongated slot) extending from an open end at a periphery of the antenna element to a closed end towards a center point 123. Antenna elements 120-*a* to 120-*d* are coupled to RFIC 110 from feed points 122-*a*, 122-*b*, 122-*c* and 122-*d*, respectively. Note that the "x's" within the "o"'s indicating feed points 122 represent I/O pads of RFIC 110, e.g., any of I/O pads 412, 512, 624 or 712 described above.

Instead of feeding each antenna element 120 at its center point 123, feed points 122-*a* to 122-*d*, in each group of four antenna elements coupled to an RFIC 110, are each offset in a different direction from the center points 123, and the slits 811 are each correspondingly aligned in a different direction. The patch design may be the same for each of the four antenna elements 120-*a* to 120-*d*, but rotated in units of 90 degrees among the antenna elements. This rotation in the patch design from antenna elements 122-*a* to 122-*d* beneficially produces pattern diversity as well as circular polarization with a low axial ratio. Each slit 811 location and dimension, and the relative location of an adjacent feed point 122, is designed to produce circular polarization for the corresponding antenna element 120. To this end, a length of each slit 811 may be in the range of ¼ to ¾ of the antenna element 120 radius. In one example, each slit 811 is approximately ⅔ the radius. Feed points 122-*a* to 122-*d* are each offset laterally from a side of the adjacent slit 811 near the closed end.

A local coordinate system for RFIC 110 with a rectangular footprint may be defined with an origin at a center point 113, a X axis parallel to upper and lower sides of the rectangular footprint, and a Y axis parallel to the left and right sides. A local coordinate system of each antenna element 120-*a* to 120-*d* may be defined with an origin at a center point 123, an x axis parallel to the X axis and a y axis parallel to the Y axis. Antenna elements 120-*a* and 120-*b* are arranged in a top row in which the center points 123 have the same +X coordinate and are spaced in the row direction by X1. Antenna elements 120-*c* and 120-*d* are in a bottom row at the same −Y level, separated in the row by X1, and spaced from the top row by Y1. The slits 811 of antenna elements 120-*a* to 120-*d*, and the corresponding feed points 122-*a* to 122-*d*, are progressively rotated by 90°. Thus, feed points 122-*a*, 122-*b*, 122-*c* and 122-*d* are each located in a different quadrant of the local x-y coordinate system. In the example, feed points 122-*a* to 122-*d* are in the bottom left (−x, −y), top left (+y, −x), top right (+x, +y), and bottom right (+x, −y) quadrants, respectively. Each feed point 122 is offset from the respective center point 123 by Δx and Δy in the x and y directions. In the y direction, in each row, the feed points have y-axis variation of 2Δy. In the x direction, as compared to feeding all of the antenna elements at the center points 123, there is a row to row variation of 2Δx.

In the arrangement of FIG. 8A, the rotation of the patch design, producing variation in the feed point 122 locations from quadrant to quadrant with respect to the centers 123 of the antenna elements 120, results in improved axial ratio and pattern diversity. However, because the feed points in each row have y-direction variation, the layout of beamforming circuitry within RFIC 110 is asymmetrical, which makes the circuit layout and packaging more complex and difficult.

Figure 8B:
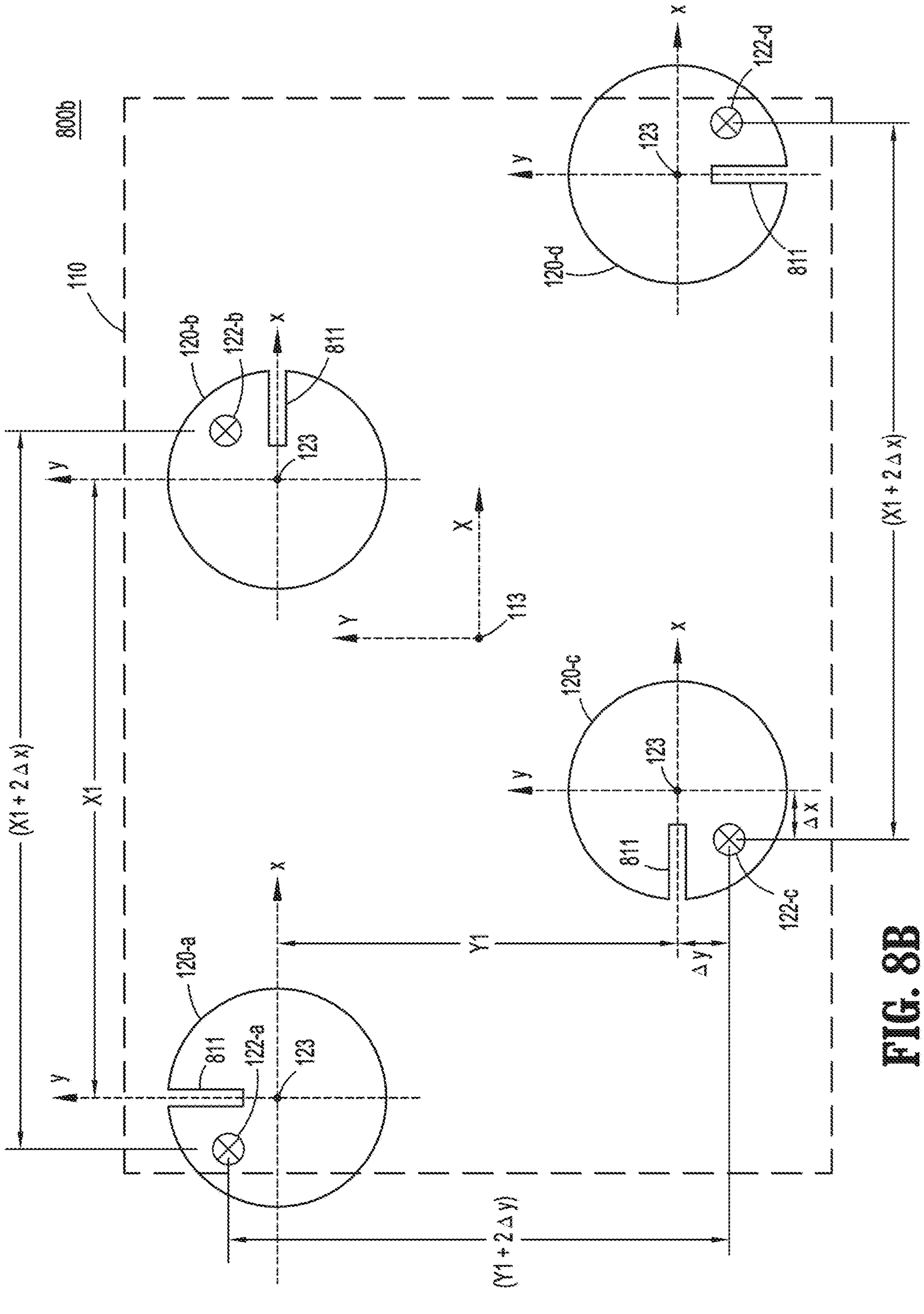

FIG. 8B illustrates another example arrangement 800*b* of antenna element feed point locations with respect to a coupled RFIC 110 in antenna apparatus 100. This case differs from arrangement 800*a* in that the feed points 122 in each row have the same Y coordinate, which allows for a simpler beamforming circuit layout. As in arrangement 800*a*, an RFIC 110 is coupled to four antenna elements 120-*a*, 120-*b*, 120-*c* and 120-*d*, which may, for comparison purposes, be assumed to have the same footprints and relative locations as in FIG. 8A. Each feed point 122 is also shown to be offset from the adjacent center point 123 by Δx and Δy. However, in arrangement 800*b*, in the top row, feed point 122-*a* is in the top left quadrant and feed point 122-*b* is in the top right quadrant. Thus, the X spacing between these feed points is (X1+2Δx), which is wider than that of arrangement 800*a* by 2Δx. Similarly, in the bottom row, feed point 122-*c* is in the bottom left quadrant and feed point 122-*d* is in the bottom right quadrant, such that the X spacing between these feed points is likewise (X1+2Δx). Further, in the Y direction the spacing between feed points 122 of the upper and lower rows is a uniform (Y1+2Δy). It is also noted that the locations of the slits 811 with respect to the quadrant locations of the feed points 122 are the same as in arrangement 800*a*.

Accordingly, for a given RFIC 110 with I/O pad locations according to arrangement 800*b*, the I/O pad locations (corresponding to the feed point 122 locations) are further apart in both the X and Y directions, as compared to the spacing between center points 123. This is also the case for arrangement 800*a*, when considering the maximum X and Y spacings between any two feed points 122. Thus, assuming the same beamforming circuitry within the RFICs 110 of arrangement 800*b* vs. 800*a*, the same rectangular footprint for RFIC 110 may be typical.

Figure 8C:
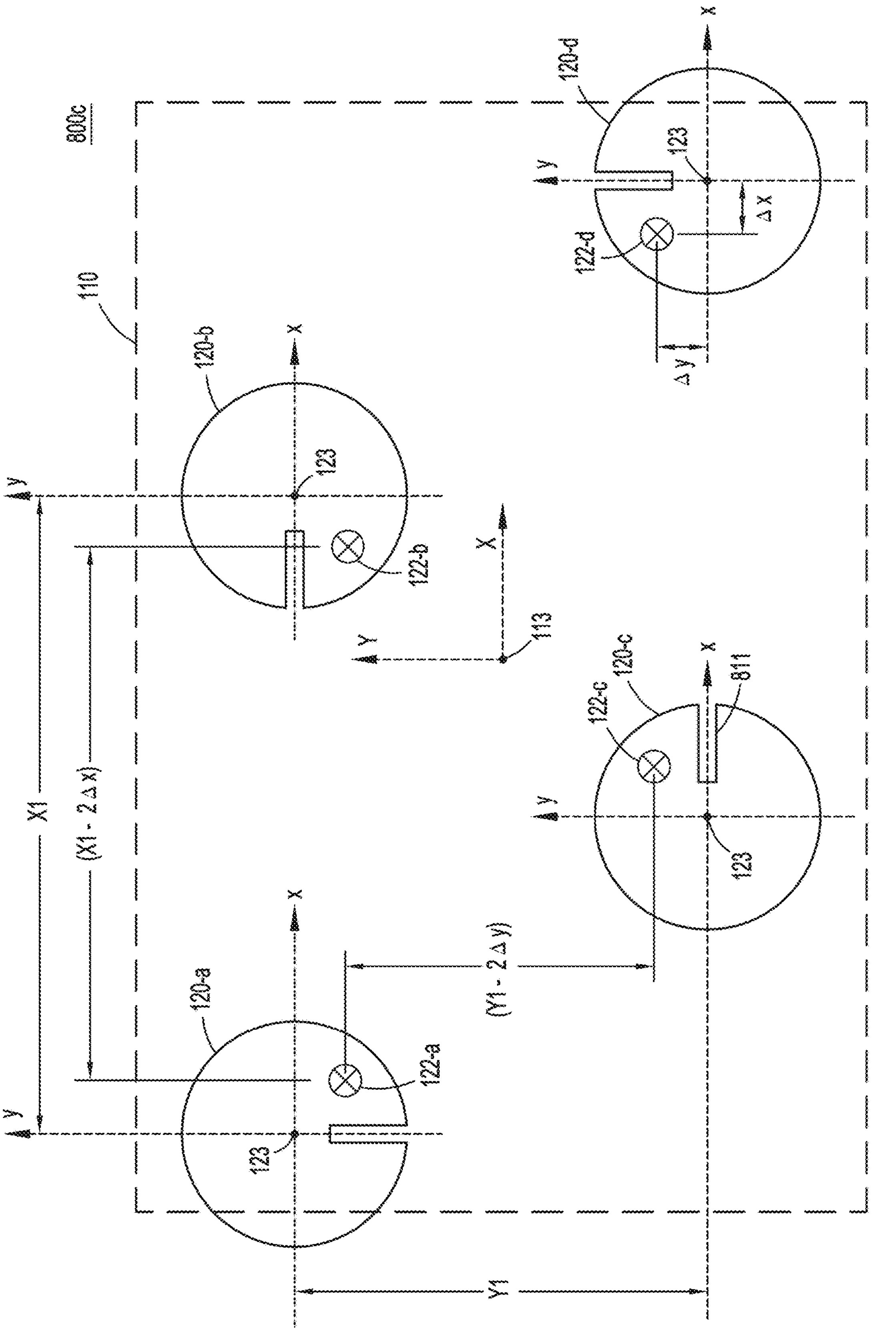

FIG. 8C illustrates yet another example arrangement 800*c* of antenna element feed point locations with respect to a coupled RFIC 110 in antenna apparatus 100. In this embodiment, the same relative locations of antenna elements 120-*a* to 120-*d* may be assumed, i.e., intra-row antenna element 120 spacings of X1 and inter-row spacings of Y1. In arrangement 800*c*, however, feed points 122-*a*, 122-*b*, 122-*c* and 122-*d* are located in the bottom right, bottom left, top right, and top left quadrants, respectively. This results in a reduced X spacing of (X1−2Δx) between feed points 122-*a*, 122-*b* in the top row and also between feed points 122-*c*, 122-*d* of the bottom row. Further, the inter-row Y spacing between feed points 122 is also reduced to (Y1−2Δy). Accordingly, with arrangement 800*c*, since the corresponding I/O pads (the "x"'s within the feed points 122, representing any of I/O pads 412, 512, etc.) it is possible to use a smaller rectangular footprint for RFIC 110, if the packaging of the beamforming components permits.

Accordingly, aspects of the arrangements 800*a*, 800*b* and 800*c* can be summarized as follows. Each of the RFICs 110 includes a plurality N I/O pads coupled to a corresponding plurality of feed points of a group of N circularly polarized antenna elements. A first antenna element of a group has at least one feed point offset from its center point in a first direction, and a second antenna element of the group has at least one feed point offset from its center point in a second, different direction different, where the first and second directions are defined relative to a common coordinate system. Each group may be a group of four antenna elements coupled to a single RFIC. If there are four antenna elements in each group, each of the four antenna elements has a feed point offset from a center of the respective antenna element in a different direction than that of any of the other of the four antenna elements, relative to a common coordinate system. Each of the antenna elements of a group can have the same design configuration with a slit and at least one feed point laterally offset from an edge of the slit to generate the circular polarization for transmit and/or receive operations. Each of the second through fourth of the four antenna elements of a group can be rotated with respect to a first antenna element of the group by K×90°, where K is in the range of one to three and is different for each one of the second through fourth antenna elements.

Figure 9:
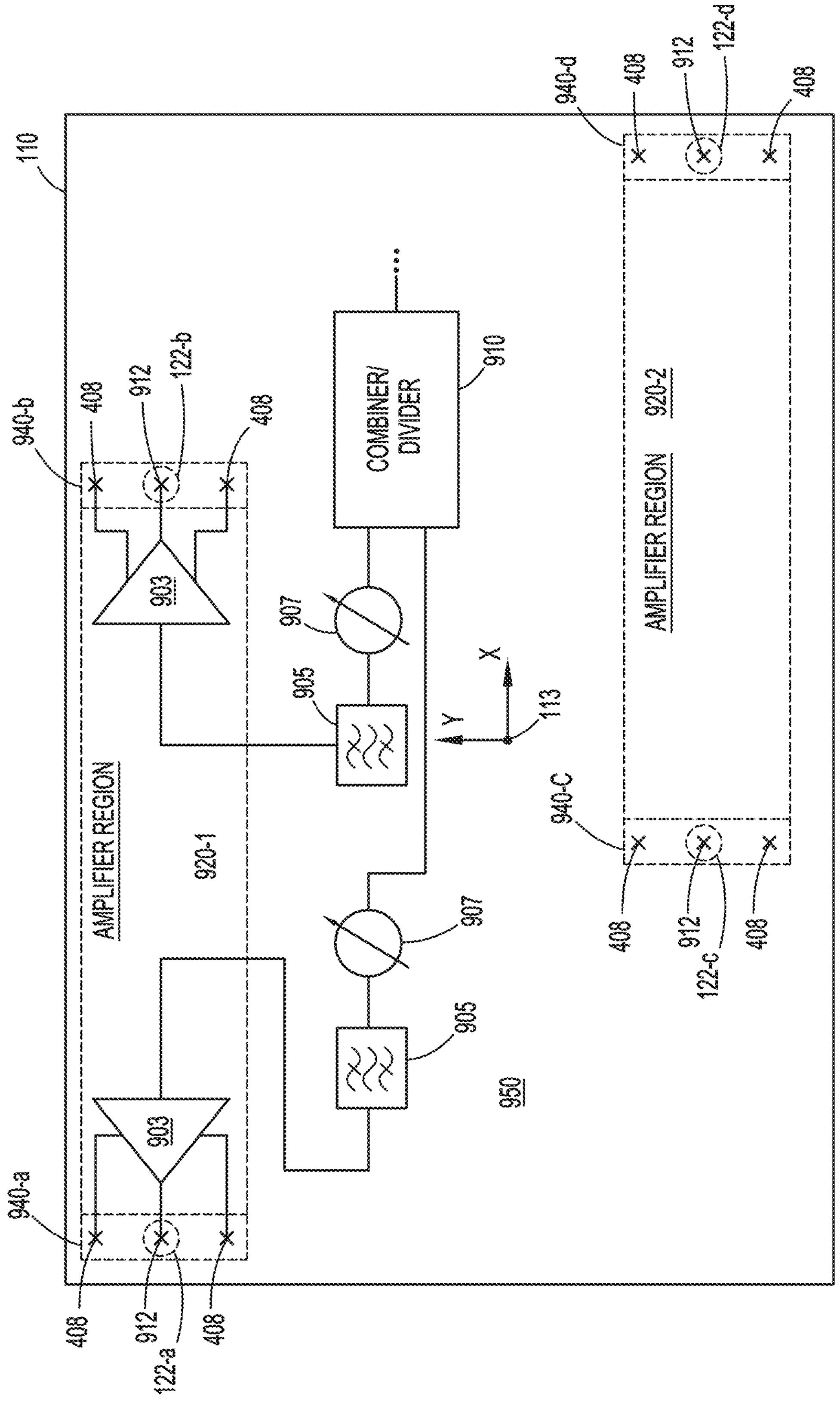
FIG. 9 illustrates an example layout of beamforming circuitry within an RFIC having I/O pads arranged according to the arrangement of FIG. 8B.

FIG. 9 illustrates an example layout of beamforming circuitry within an RFIC 110 having I/O pads arranged according to arrangement 800*b* of FIG. 8B. In this example, RFIC 110 has four GSG I/O pad connection sets ("GSG sets") 940-*a*, 940-*b*, 940-*c* and 940-*d*, each having a signal I/O pad ("S pad") 912 and a pair of ground ("G") pads 408 on opposite sides of the S pad 912. Thus, each of the GSG sets 940-*a* to 940-*d* may be a set of linearly aligned first and second ground pads and a signal pad that collectively form an oblong profile with a long axis and an orthogonal short axis, where the long axis is substantially parallel to the left and right edges of the respective RFIC 110.

Each S pad 912 may be configured as any of the above-described I/O pads 412, 512, 624 or 712, and each G pad 408 may be configured as any of the G pads 408 of FIG. 4. Each S pad 912 is coupled to a corresponding feed point 122-*a* to 122-*d* using any of the connection structures described above for I/O pads 412, 512, etc. Thus, each S pad 912 is aligned with a respective one of feed points 122-*a*, 122-*b*, 122-*c* and 122-*d*. In each GSG set 940-*a* to 940-*d*, the G pads 408 and S pad 912 may be linearly aligned in the Y direction.

A first output amplifier region 920-1 may be disposed between GSG sets 940-*a* and 940-*b*, and a second output amplifier region 920-2 may be disposed between GSG sets 940-*c* and 940-*d*. Each GSG set 940-*a* to 940-*d* may connect to the output or input of a respective amplifier 903 within the adjacent amplifier region 920-1 or 920-2. In the illustrated example, amplifiers 903 are power amplifiers on transmit, and each GSG set connects to an amplifier 903 output port. In other examples, some of amplifiers 903 are PAs and other amplifiers 903 are LNAs. In the latter case, any given GSG set 940 may connect to an input of an LNA.

A circuit region 950 with additional beamforming circuitry may be disposed outside regions 920-1 and 920-2. For example, each amplifier 903 may be coupled to a respective bandpass filter 905 and phase shifter 907 within circuit region 950. Generally speaking, amplifiers 903 in conjunction with the beamforming circuitry within circuit region 950 adjusts (e.g., amplifies, phase shifts, filters, etc.) signals input from/output GSG sets 940 (received from/output to antenna elements 120). Circuit region 950 may further include at least one combiner/divider 910 comprised of one or more RF couplers (e.g., 3 dB directional couplers) for combining and/or dividing signals received from/transmitted to at least two antenna elements 120.

GSG sets 940-*a* and 940-*d* are disposed proximate the upper left and lower right corners, respectively, of RFIC 110. These locations may be set as close as possible to the respective left and right edges of RFIC 110 (as seen in FIG. 9) as design rules of the foundry producing RFIC 110 allow. GSG sets 940-*a* and 940-*b* may be at the same Y level proximate to the upper edge of RFIC 110; and GSG sets 940-*c* and 940-*d* may be at the same −Y level proximate to the lower edge. GSG set 940-*b* may have an X-direction central coordinate about halfway between that of GSG sets 940-*c* and 940-*d*. Likewise, GSG set 940-*c* may have an X-direction central coordinate about halfway that of GSG sets 940-*a* and 940-*b*. When each GSG set 940 is aligned with a corresponding feed point 122 of an antenna element 120 as described above, the locations of the GSG sets 940 are aligned with the triangular lattice points 123 of the antenna elements 120 as shown in FIG. 2. This configuration differs from standard RFIC chips, which typically have all I/O pads arranged symmetrically adjacent to opposite edges of their rectangular footprints. For instance, in a standard RFIC chip, GSG set 940-*c* is disposed at the lower left corner and GSG set 940-*b* is disposed at the upper right corner. The arrangement of FIG. 9, which moves some of the GSG sets inwardly from the corners, allows for alignment of the GSG sets with the antenna feed points 122.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An antenna apparatus comprising:

a first component layer comprising a plurality of radio frequency integrated circuit chips (RFICs) arranged in a first plane with a first lattice geometry, each of the RFICs comprising beamforming circuitry;

a second component layer overlaying the first component layer and comprising a plurality of antenna elements arranged in a second plane with a second, different lattice geometry, wherein the second plane is parallel to the first plane, the first and second lattice geometries are different two dimensional geometries, the antenna elements have respective feed points each coupled to an input/output (I/O) pad of one of the RFICs, and each said I/O pad is aligned with the feed point coupled thereto along an axis orthogonal to the first and second planes; and a substrate between the first and second component layers, and a plurality of vias extending through the substrate, each of the vias coupling one of the antenna elements to one of a plurality of I/O pads of the RFICs, wherein an active die side of each of the RFICs faces opposite the substrate and the second component layer.

2. The antenna apparatus of claim 1, wherein the first lattice geometry is rectangular and the second lattice geometry is triangular.

3. The antenna apparatus of claim 1, wherein the plurality of I/O pads are flipchip I/O pads, each said flipchip I/O pad being electrically connected to one of the vias through a flipchip electrical connection joint.

4. The antenna apparatus of claim 3, wherein the flipchip electrical connection joint is surrounded by an underfill layer between the substrate and the second component layer; and the antenna apparatus further comprises a polymer overcoat layer between the second component layer and the underfill layer.

5. The antenna apparatus of claim 1, wherein:

the plurality of vias are a plurality of first vias;

the antenna apparatus further comprising:

a plurality of second vias each extending from an inactive side of an RFIC of the RFICs to an active side of the RFIC; and a plurality of electrical connection joints each coupling an end of a first via to an end of a second via.

6. The antenna apparatus of claim 5, wherein the plurality of electrical connection joints are each surrounded by an underfill layer between the antenna substrate and the second component layer.

7. The antenna apparatus of claim 1, wherein each of the RFICs comprises a plurality N of I/O pads coupled to a corresponding plurality of feed points of N of the antenna elements, and the antenna apparatus being devoid of any transmission line oriented parallel to the first and second planes for coupling any RFIC in the first component layer to any antenna element in the second component layer.

8. The antenna apparatus of claim 1, wherein:

each of the RFICs comprises a plurality N of I/O pads coupled to a corresponding plurality of feed points of N of the antenna elements;

each of the antenna elements is a circularly polarized patch antenna element; and a first antenna element of the plurality of antenna elements has at least one feed point offset from a center of the first antenna element in a first direction, and a second antenna element of the plurality of antenna elements has at least one feed point offset from a center of the second antenna element in a second direction different from the first direction, the first and second directions being defined relative to a common coordinate system.

9. The antenna apparatus of claim 1, wherein the antenna elements are arranged in groups of four antenna elements coupled to a single one of the RFICs, and in each said group, each of the four antenna elements has a feed point offset from a center of the respective antenna element in a different direction than that of any of the other of the four antenna elements, relative to a common coordinate system.

10. The antenna apparatus of claim 9, wherein:

each of the antenna elements of a group has a same design configuration with a slit and at least one feed point laterally offset from an edge of the slit to generate circular polarization for transmit and/or receive operations;

each of second through fourth of the four antenna elements of a group is rotated with respect to a first antenna element of the group by K×90°, where K is in the range of one to three and is different for each one of the second through fourth antenna elements.

11. The antenna apparatus of claim 1, further comprising a ground plane between the first and second component layers.

12. The antenna apparatus of claim 1, wherein the first lattice geometry is rectangular and the second lattice geometry is triangular, and the antenna apparatus further comprising:

an antenna substrate between the first and second component layers; and a plurality of vias extending through the antenna substrate, each of the vias coupling a feed point of one of the antenna elements to one of the I/O pads;

wherein the antenna elements are arranged in groups of a plurality N antenna elements coupled to a single respective one of the RFICs, and in each group, each of the N antenna elements has a feed point offset from a center of the respective antenna element in a direction different from a feed point offset direction of any of the other of the N antenna elements, relative to a common coordinate system.

13. The antenna apparatus of claim 12, wherein N equals four.

14. The antenna apparatus of claim 12, further comprising a ground plane between the antenna substrate and the second component layer.

15. The antenna apparatus of claim 12, further comprising a ground plane between the antenna substrate and the second component layer, wherein each of the RFICs includes first, second, third and fourth ground-signal-ground I/O pad connection sets ("GSG sets"), with a signal I/O pad of each GSG set being coupled to a feed point of a respective antenna element, and first and second ground pads of each GSG set each being coupled to the ground plane.

16. The antenna apparatus of claim 15, wherein:

each RFIC of the RFICs has a rectangular profile with top, bottom, left and right edges, wherein an X direction is parallel to the top and bottom edges and a Y direction is parallel to the left and right edges;

the first GSG set is disposed at a top left corner of a respective RFIC of the RFICs and the fourth GSG set is disposed at a bottom right corner of the respective RFIC;

the second GSG set has a Y coordinate proximate the top edge and an X coordinate about halfway between X-coordinates of the third and fourth GSG sets; and the third GSG set has a Y coordinate proximate the bottom edge and an X coordinate about halfway between X coordinates of the first and second and fourth GSG sets.

17. The antenna apparatus of claim 16, wherein each of the GSG sets is a set of linearly aligned first and second ground pads and a signal pad that collectively form an oblong profile with a long axis and an orthogonal short axis, the long axis being substantially parallel to the left and right edges of the respective RFIC.

18. The antenna apparatus of claim 12, wherein the beamforming circuitry is millimeter wave front end circuitry.

19. An antenna apparatus comprising:

a first component layer comprising a plurality of radio frequency integrated circuit chips (RFICs) arranged in a first plane with a first lattice geometry, each of the RFICs comprising beamforming circuitry; and a second component layer overlaying the first component layer and comprising a plurality of antenna elements arranged in a second plane parallel to the first plane, with a second lattice geometry, wherein each of the first and second lattice geometries is a two dimensional geometry, the antenna elements having respective feed points each coupled to an input/output (I/O) pad of one of the RFICs, each said I/O pad being aligned with the feed point coupled thereto along an axis orthogonal to the first and second planes.

20. An antenna apparatus comprising:

a first component layer comprising a plurality of radio frequency integrated circuit chips (RFICs) arranged in a first plane with a first lattice geometry, each of the RFICs comprising beamforming circuitry; and a second component layer overlaying the first component layer and comprising a plurality of antenna elements arranged in a second plane parallel to the first plane, with a second lattice geometry, wherein each of the first and second lattice geometries is a two dimensional geometry, the antenna elements having respective feed points each coupled to an input/output (I/O) pad of one of the RFICs, each said I/O pad being aligned with the feed point coupled thereto along an axis orthogonal to the first and second planes, wherein:

each of the RFICs comprises a plurality N of I/O pads coupled to a corresponding plurality of feed points of N of the antenna elements;

each of the antenna elements is a circularly polarized patch antenna element; and a first antenna element of the plurality of antenna elements has at least one feed point offset from a center of the first antenna element in a first direction, and a second antenna element of the plurality of antenna elements has at least one feed point offset from a center of the second antenna element in a second direction different from the first direction, the first and second directions being defined relative to a common coordinate system.

21. An antenna apparatus comprising:

a first component layer comprising a plurality of radio frequency integrated circuit chips (RFICs) arranged in a first plane with a first lattice geometry, each of the RFICs comprising beamforming circuitry; and a second component layer overlaying the first component layer and comprising a plurality of antenna elements arranged in a second plane parallel to the first plane, with a second lattice geometry, wherein each of the first and second lattice geometries is a two dimensional geometry, the antenna elements having respective feed points each coupled to an input/output (I/O) pad of one of the RFICs, each said I/O pad being aligned with the feed point coupled thereto along an axis orthogonal to the first and second planes, wherein the antenna elements are arranged in groups of four antenna elements coupled to a single one of the RFICs, and in each said group, each of the four antenna elements has a feed point offset from a center of the respective antenna element in a different direction than that of any of the other of the four antenna elements, relative to a common coordinate system.

22. An antenna apparatus comprising:

a first component layer comprising a plurality of radio frequency integrated circuit chips (RFICs) arranged in a first plane with a first lattice geometry, each of the RFICs comprising beamforming circuitry;

a second component layer overlaying the first component layer and comprising a plurality of antenna elements arranged in a second plane parallel to the first plane, with a second lattice geometry, wherein each of the first and second lattice geometries is a two dimensional geometry, the antenna elements having respective feed points each coupled to an input/output (I/O) pad of one of the RFICs, each said I/O pad being aligned with the feed point coupled thereto along an axis orthogonal to the first and second planes;

an antenna substrate between the first and second component layers; and a plurality of vias extending through the antenna substrate, each of the vias coupling a feed point of one of the antenna elements to one of the I/O pads, wherein the antenna elements are arranged in groups of a plurality N antenna elements coupled to a single respective one of the RFICs, and in each group, each of the N antenna elements has a feed point offset from a center of the respective antenna element in a direction different from a feed point offset direction of any of the other of the N antenna elements, relative to a common coordinate system.

* * * * *